(12) United States Patent
Lowry

(10) Patent No.: US 10,899,363 B2
(45) Date of Patent: Jan. 26, 2021

(54) AUTOMATIC CONFIGURATION OF SELF-CONFIGURABLE ENVIRONMENTS

(71) Applicant: Apple Inc., Cupertino, CA (US)

(72) Inventor: Thomas Ethan Lowry, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 16/138,277

(22) Filed: Sep. 21, 2018

(65) Prior Publication Data
US 2019/0023278 A1 Jan. 24, 2019

Related U.S. Application Data

(63) Continuation of application No. 14/806,479, filed on Jul. 22, 2015, now Pat. No. 10,081,368, which is a (Continued)

(51) Int. Cl.
*B60W 50/08* (2020.01)
*B60W 50/00* (2006.01)
(Continued)

(52) U.S. Cl.
CPC ............. *B60W 50/08* (2013.01); *B60R 16/02* (2013.01); *B60R 25/30* (2013.01);
(Continued)

(58) Field of Classification Search
CPC ..... B60R 16/037; B60R 21/015; B60R 16/02; B60R 25/03; B60N 2/02; B60N 2/06; B60N 2/14; B60N 2/90
See application file for complete search history.

(56) References Cited

U.S. PATENT DOCUMENTS 5,630,159 A 5/1997 Zancho
5,711,712 A 1/1998 Graf
(Continued)

FOREIGN PATENT DOCUMENTS

WO WO-2005068259 A1 * 7/2005 ........... B60R 16/037

OTHER PUBLICATIONS hothardware.com, "BMW Working on Adaptive Navigation System", Feb. 26, 2009 (Available online at http://hothardware.com/cs/forums/t/42123.aspx, last visited Jan. 24, 2012) (1 page).

*Primary Examiner* — Ronald D Hartman, Jr.
(74) *Attorney, Agent, or Firm* — Young Basile Hanlon & MacFarlane, P.C.

(57) ABSTRACT

A portable electronic device for repositioning adjustable fixtures in vehicles. The portable electronic device includes a communication module, a processor, and a memory that stores computer program instructions that cause the processor to receive a first configuration setting that is specific to the first vehicle, the first configuration setting describing a preferred position of a first adjustable fixture in the first vehicle, translate the first configuration setting into a second configuration setting that is specific to a second vehicle, and transmit, to the second vehicle using the communication module, the second configuration setting to the second vehicle for use in moving a second adjustable fixture in the second vehicle from an initial position to an adjusted position that is based on the preferred position.

20 Claims, 7 Drawing Sheets

Related U.S. Application Data continuation of application No. 13/361,277, filed on Jan. 30, 2012, now abandoned.

(51) Int. Cl.
*B60R 25/30* (2013.01)
*B60R 16/02* (2006.01)

(52) U.S. Cl.
CPC .............. *B60W 2050/0002* (2013.01); *B60W 2050/0075* (2013.01); *B60W 2050/0082* (2013.01); *B60W 2050/0083* (2013.01); *B60W 2050/0089* (2013.01)

(56) References Cited

U.S. PATENT DOCUMENTS

| | | | |
|---|---|---|---|
| 6,100,811 A | 8/2000 | Hsu et al. | |
| 6,208,854 B1 | 3/2001 | Roberts et al. | |
| 6,477,374 B1 | 11/2002 | Shaffer et al. | |
| 6,505,780 B1 | 1/2003 | Yassin et al. | |
| 6,987,988 B2 | 1/2006 | Uchiyama | |
| 7,124,167 B1 | 10/2006 | Bellotti et al. | |
| 7,135,958 B1 | 11/2006 | Suuronen et al. | |
| 7,171,221 B1 | 1/2007 | Amin et al. | |
| 7,477,970 B2 | 1/2009 | Bruelle-Drews | |
| 7,624,834 B2 | 12/2009 | Hofbeck et al. | |
| 7,975,028 B2 | 7/2011 | Ryan et al. | |
| 8,185,274 B2 | 5/2012 | Garg | |
| 8,527,146 B1 | 9/2013 | Jackson et al. | |
| 9,171,268 B1 | 10/2015 | Penilla et al. | |
| 9,229,905 B1 | 1/2016 | Penilla et al. | |
| 9,758,116 B2 | 9/2017 | Xiong et al. | |
| 2002/0096572 A1 | 7/2002 | Chene et al. | |
| 2004/0158371 A1 | 8/2004 | Iggulden et al. | |
| 2005/0017842 A1 | 1/2005 | Dematteo | |
| 2006/0195483 A1 | 8/2006 | Heider et al. | |
| 2007/0038345 A1* | 2/2007 | Heider | B60R 16/037 701/49 |
| 2007/0161095 A1 | 7/2007 | Gurin | |
| 2008/0024296 A1* | 1/2008 | Jeong | G08C 17/02 340/539.26 |
| 2008/0228358 A1 | 9/2008 | Wang et al. | |
| 2010/0087987 A1* | 4/2010 | Huang | B60W 40/08 701/36 |
| 2011/0106375 A1 | 5/2011 | Gurusamy Sundaram | |
| 2011/0237186 A1* | 9/2011 | Preissinger | B60R 16/037 455/41.1 |
| 2012/0053794 A1* | 3/2012 | Alcazar | B60N 2/0244 701/48 |
| 2012/0115446 A1* | 5/2012 | Gautama | H04W 4/44 455/414.1 |
| 2012/0179325 A1* | 7/2012 | Faenger | B60K 35/00 701/31.4 |
| 2012/0303178 A1* | 11/2012 | Hendry | B60R 16/037 701/2 |
| 2013/0124009 A1 | 5/2013 | Esler | |
| 2013/0197674 A1* | 8/2013 | Lowry | B60W 50/08 700/19 |
| 2014/0088793 A1 | 3/2014 | Morgan et al. | |
| 2015/0197205 A1 | 7/2015 | Xiong et al. | |
| 2018/0089912 A1 | 3/2018 | Penilla et al. | |

* cited by examiner

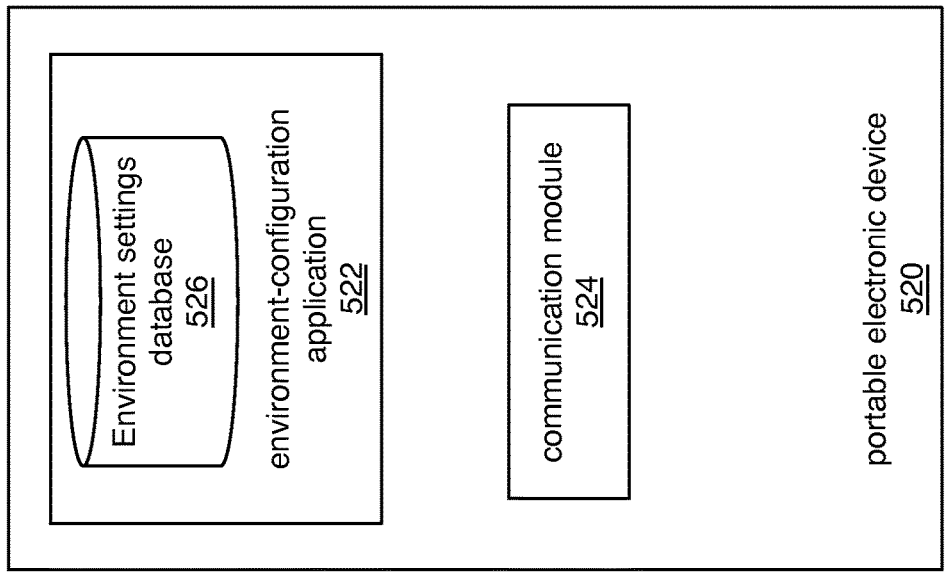
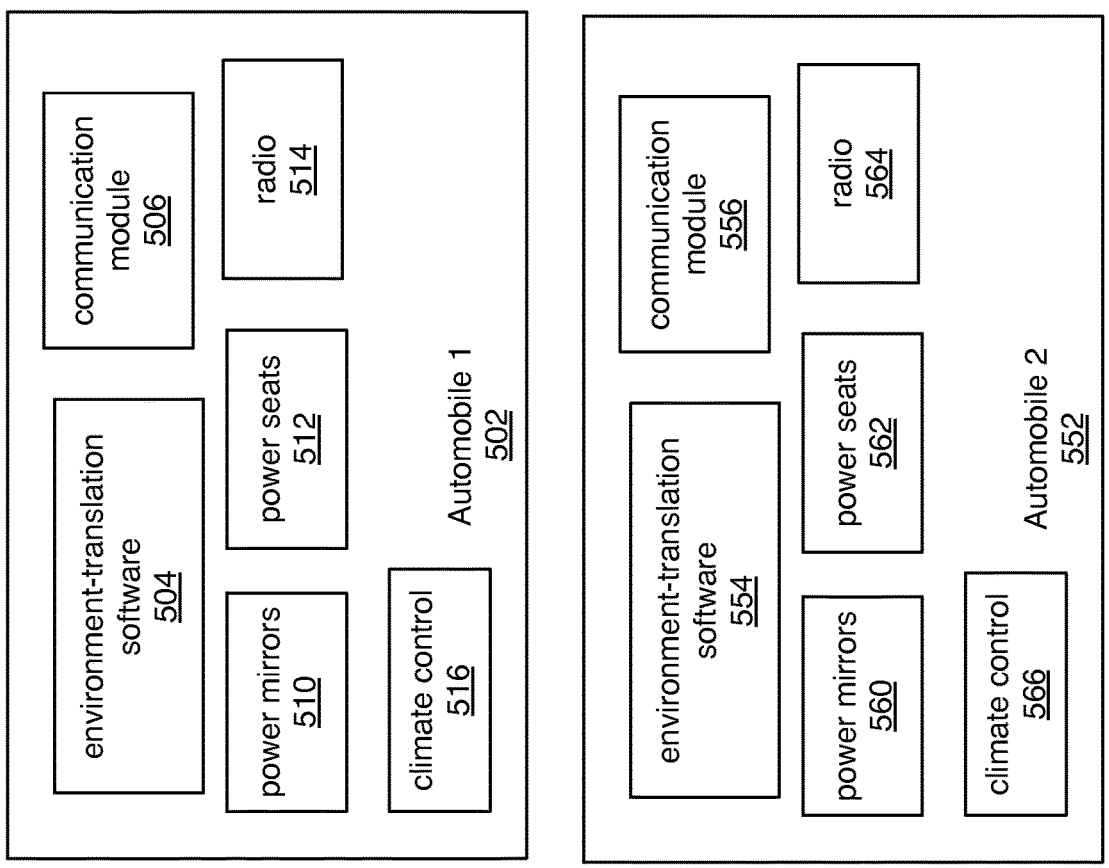
FIG. 5

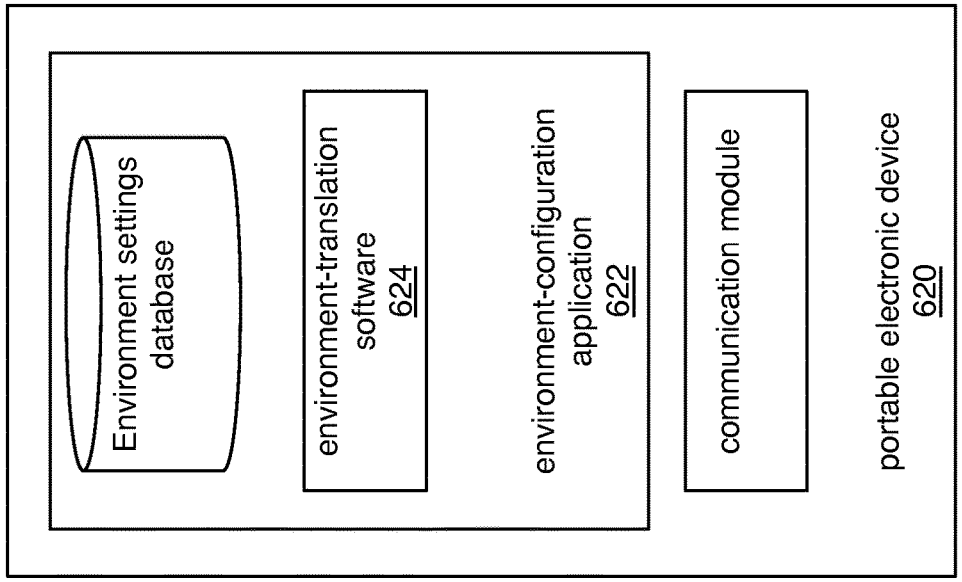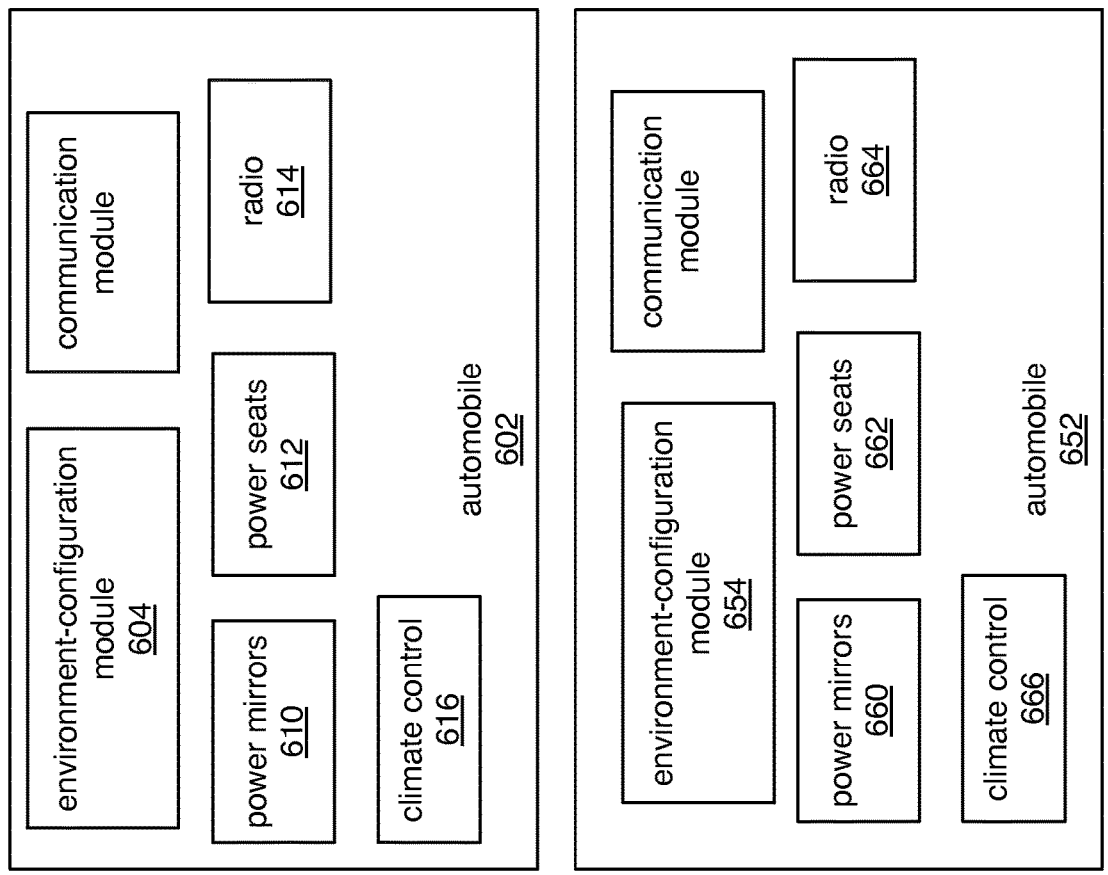
FIG. 6

AUTOMATIC CONFIGURATION OF SELF-CONFIGURABLE ENVIRONMENTS

CROSS-REFERENCE TO RELATED APPLICATIONS

This application is a continuation of U.S. patent application Ser. No. 14/806,479, filed Jul. 22, 2015, which is a continuation of U.S. patent application Ser. No. 13/361,277 filed Jan. 30, 2012, and entitled "Automatic Configuration of Self-Configurable Environments," which is hereby incorporated herein by reference in its entirety.

TECHNICAL FIELD

The present disclosure relates generally to self-configurable environments and more specifically to techniques and systems for storing configuration details on a portable consumer device and communicating those configuration details to a self-configurable environment to enable the self-configurable environment to configure itself.

BACKGROUND

An example of a self-configurable environment that some consumers might be familiar with is an automobile in which a consumer can adjust a car seat, power mirrors, and steering wheel, and associate the configuration with a button. In such automobiles two different drivers can each associate a particular configuration of the seat, mirrors, and steering wheel with one of the buttons and when they enter the car, they can press the button and the car will reconfigure itself according to the associated configuration.

Such self-configurable environments are very convenient; however, they are not readily transportable. Accordingly, the present technology solves this problem.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology makes it possible for users of portable consumer electronic devices to bring environment configuration information with them and communicate the environment configuration to visited environments so that the visited environment can automatically configure itself to the user's preferences.

An example of such a configurable environment could be an automobile. A user could allow their phone to learn configuration preferences from the user's personal automobile, and when the user visits another automobile, such as when renting a car, or buying a new car, those configuration preferences could be imported into the visited automobile and used to automatically configure the automobile according to the imported preferences. Such preferences could include seat orientation, radio preferences (especially satellite radio), climate control preferences, and mirror orientation preferences.

In some embodiments, an application running on a portable electronic device can include a user interface sufficient to receive an instruction from the user to request configuration information from a home environment. As not all similar environments (i.e., one car to another) share the same dimensions or default configurations, the application can include a translation function, by which it could standardize received information, and translate the information according to the appropriate environment when transmitting the configuration information.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an exemplary system embodiment;
FIG. 6 illustrates an exemplary system embodiment.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure describes a technology in which a collection of configuration settings can be stored in a portable consumer device. When the portable consumer device is in a configurable environment, the portable consumer device can communicate the stored collection of configuration settings to the configurable environment, which can then configure itself according to those configuration settings. An example in which this technology might be relevant is if a consumer configures an automobile to his preferences. If those preferences are stored in the consumer's portable consumer device, then when the consumer enters another car, such as a rental car, configured with the present technology, that car can configure itself to the consumer's preferences.

Figure 1:
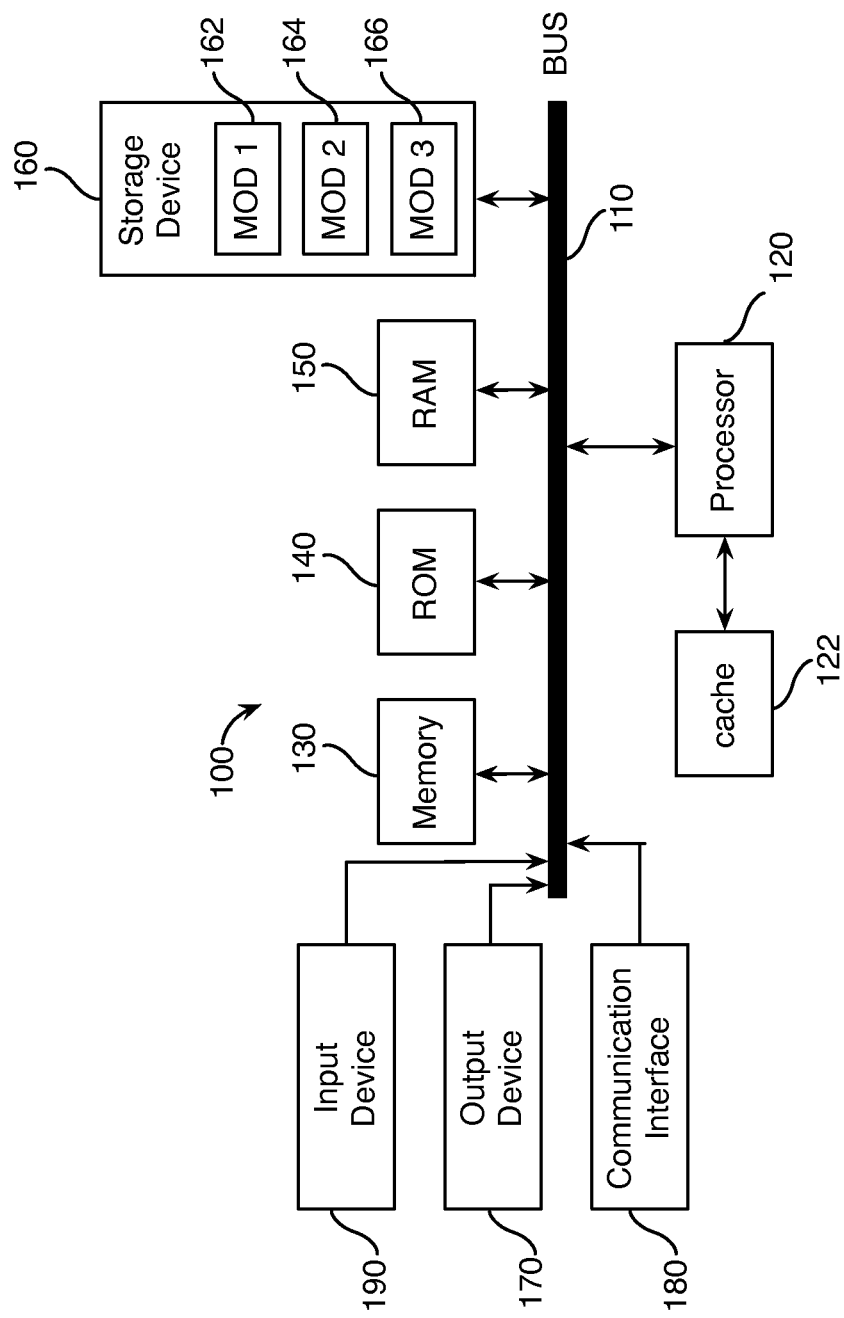
FIG. 1 illustrates an exemplary system embodiment.

A brief introductory description of a basic general purpose system or computing device, which can be employed to practice these concepts is illustrated in FIG. 1. A more detailed description of the present technology will follow. Several variations shall be discussed herein as the various embodiments are set forth. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of the present technology for the automatic configuration of self-configurable environments.

Figure 2:
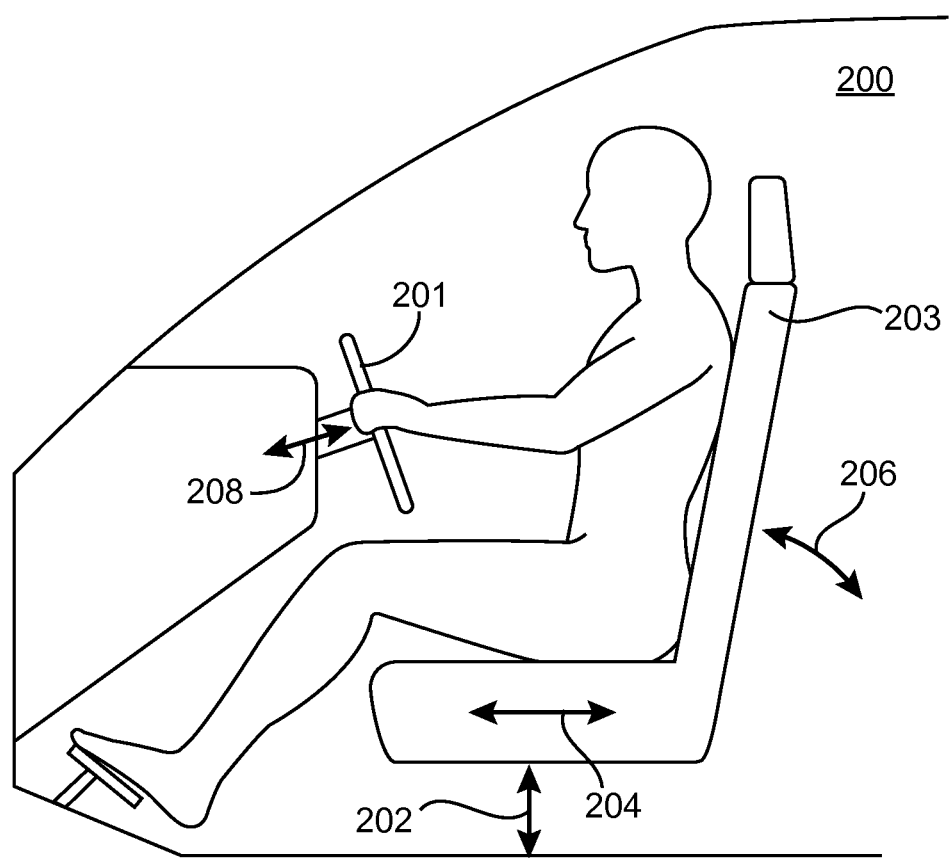
FIG. 2 illustrates an exemplary application of the present technology.

FIG. 2 illustrates an exemplary application of the present technology. Specifically, FIG. 2 illustrates a side view of a passenger compartment 200 of an automobile. As illustrated, the passenger compartment 200 includes an adjustable steering wheel 201, and adjustable seat 203. By way of non-limiting example, the seat 203 is adjustable up and down 202, backward and forward 204, and increasing and decreasing an angle of recline 206. The steering wheel 201 is adjustable to move closer to and farther from 208 a driver. While not shown, other aspects of the passenger experience can also be adjustable, such as mirrors, lumbar support, air conditioning temperature, radio preferences, etc.

Based on the configuration of the adjustable components discussed above, FIG. 3 illustrates distances and angles that can be measured to represent the physical configuration of the passenger compartment. These distances and angles can be determined by environment-translation software that would be aware of the dimensions of the passenger compartment, and that would use these dimensions along with information regarding the adjustments made to the passenger compartment. In some embodiments, this environment-translation software could be part of the automobile, and such software would report standard statistics to a portable consumer device (i.e., the measurements illustrated in FIG. 3). While in some embodiments the environment-translation software would be resident on a portable consumer device and the automobile would report the adjustments made to the passenger compartment, and the portable consumer device could translate these measurements from one automobile to another.

Figure 3:
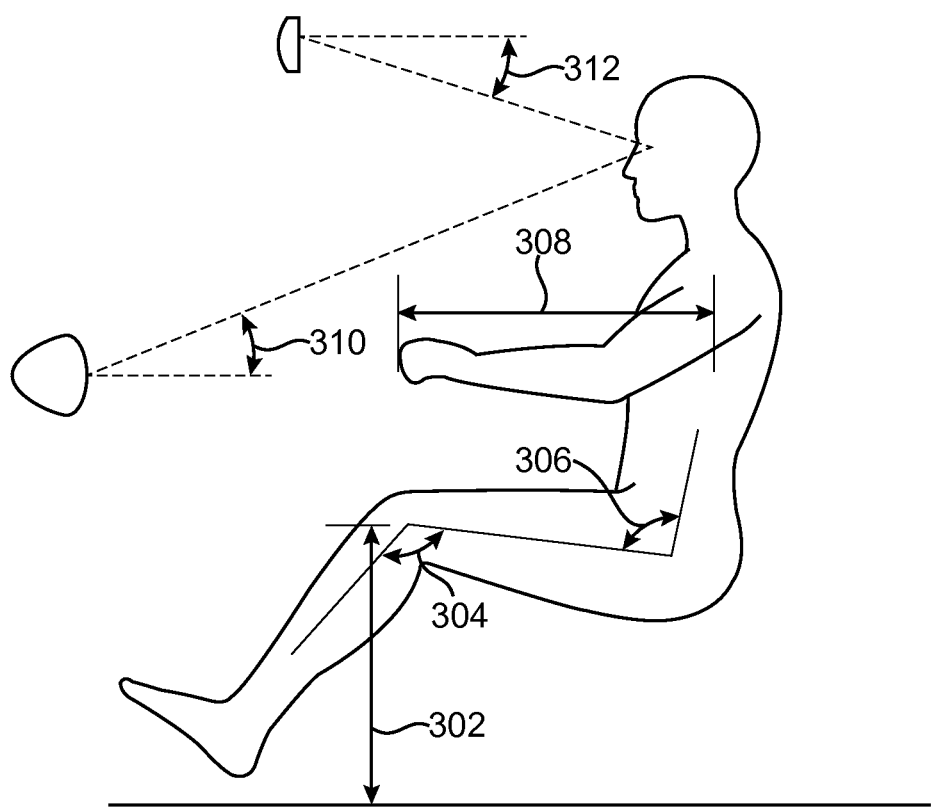
FIG. 3 illustrates distances and angles that can be measured to represent the physical configuration of a passenger compartment of an exemplary configurable environment.

The distances and angles illustrated in FIG. 3 can be considered standard measurements that can be translated to any other automobile environment. In some embodiments the distances are determined by utilizing a value known to the environment-translation software discussed above.

Distance 302 represents the distance from the floor board to the passenger's knee. Distance 302 can be determined by the environment-translation software when the software is aware that the top of the driver's seat is by default 12 inches above the floor board, and the passenger has adjusted the seat upwards one inch. Thus, the environment-translation software would learn from the automobile that the distance 302 is 13 inches.

Also relevant to the orientation of the driver's knees is the angle of bend 304. Angle 304 can be determined by the environment-translation software when the software is aware of the default incline of the seat, and the default distance from the edge of the driver's seat (just below the knees) to the operational pedals (gas, brake, etc.). The software can also learn of any adjustment to the angle of the seat, or distance to the operational pedals. Based on this information the software can calculate the angle of knee bend, or look up the approximate angle in a chart as is well-known in the geometry arts.

Angle 306 represents the angle of a driver's recline. The default angle of the bottom portion of the chair relative to the backrest portion of the chair can be known by the environment-translation software, and any adjustments from the default can be accounted to result at Angle 306.

Distance 308 represents the distance from the driver's shoulders to the steering wheel. This distance can be determined by the environment-translation software when the software is aware that the driver's seat is by default 16 inches from the steering wheel, and can further account for changes in the seat's relative position (forward or backward adjustments), angle of incline in the seat (the greater the adjustment to the backrest portion of the driver's seat that results in a more reclined driving position, the farther the driver's shoulders will be from the steering wheel), and adjustments to the telescoping steering wheel (forward or backward adjustments).

In some embodiments an infrared camera and skeletal tracking software can be used to determine the positions of the various body regions discussed above.

FIG. 3 also illustrates mirror adjustment angles 310 and 312. In some embodiments, these angles can be reported directly from the mirrors themselves, if they are power mirrors or can otherwise sense adjustments. In embodiments wherein the mirror is not a power mirror or lacks the necessary sensors, these angles can be calculated by approximating where a user's head is expected to be based on its expected position relative to the known position of the headrest. Again, the environment-translation software can be aware of the default position of the headrest and adjust for movement of the seat. In some embodiments, it might be possible for the software to learn of adjustments to the headrest itself. In some embodiments, a camera, such as an infrared camera can be used to actually determine the location of the driver's head itself. Once the location of the driver's head is known or approximated, the environment-translation software can calculate the angle of adjustment from the known mirror location and a predetermined target vantage point.

Figure 4:
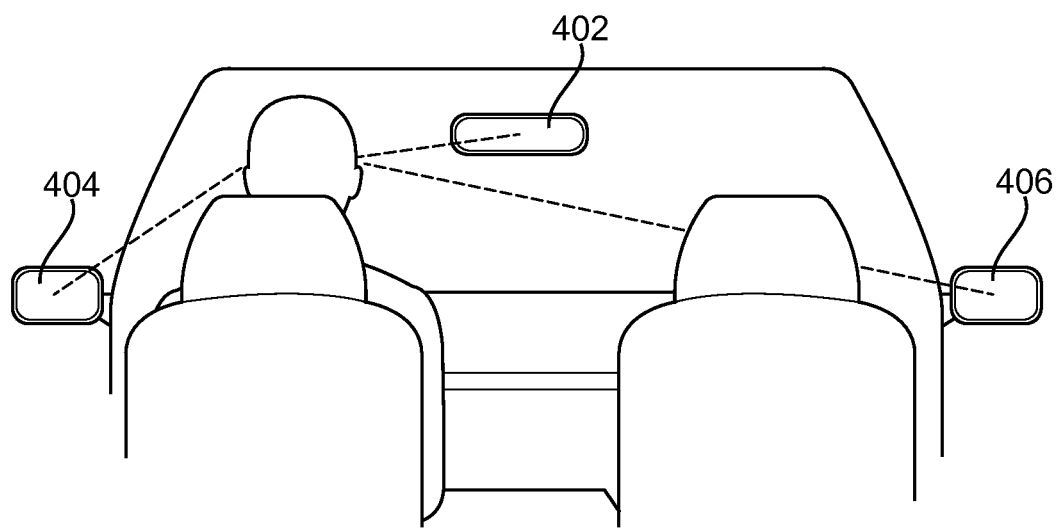
FIG. 4 illustrates an exemplary rear view of an exemplary configurable environment.

FIG. 4 illustrates a view from the rear of an automobile, which shows the back of a driver's head and its relationship to the rear view mirror 402, driver's side mirror 404, and passenger's side mirror 406.

Mirrors need to be adjusted left and right as well as up and down. In some embodiments the mirrors can provide all of the relevant angles to the environment-translation software as introduced above. In some embodiments, the location of a driver's head can be approximated, or learned (as addressed above) and an angle of adjustment can be calculated based on the known mirror locations, the location of the driver's head, and a predetermined target vantage point.

By determining the standard measurements and angles corresponding to a user's configuration preference for one automobile, the environment-translation software can translate those measurements to other automobiles including automobiles of different makes and models. As long as the software has knowledge of the default configuration of an automobile, the standard measurements can be converted and applied to another automobile.

Likewise, the environment-translation software can also learn of other preferences that can be exported from one automobile to another including climate control preferences, radio preferences, etc.

FIG. 5 illustrates an exemplary system embodiment showing two automobiles, Automobile 1 502 and Automobile 2 552, and a portable electronic device 520. Consistent with the descriptions herein, portable electronic device 520 can be used to learn configuration settings applied to one automobile, such as Automobile 1 502, and can use those configuration settings to allow another automobile, such as Automobile 2 552, to configure itself according to those configuration settings.

In the embodiment illustrated in FIG. 5 each automobile 502 and 552 includes environment-translation software 504 554. The environment-translation software 504 554 can be configured to communicate with the various configurable components including but not limited to power mirrors 510 560, power seats 512 562, radio 514 564, climate control 516 566 to learn the configuration settings of the configurable components.

As may be appreciated the configuration settings of the various components can be relevant to the specific make and model of the automobile from which they were measured or otherwise collected. In such embodiments, the environment-translation software 504 can translate the automobile specific configuration settings into standard measurements. These standard measurements can be communicated using the communication module 506 556 to the portable electronic device 520 though communication module 524 for storage within an environmental settings database 526. In some embodiments the environmental settings database 526 can be part of an environment-configuration application 522.

Once the standard configurations are stored in the environmental settings database 526, a user can take the portable electronic device into any other car configured with the present technology, and transmit the configuration settings into the other car, which can automatically configure itself according to the settings. For example, using the environment-configuration application 522 a user can command the device to initiate a connection with the automobile via its communication module 524, and transmit the standard measurements to the automobile 502 552 via its communication module 506 556. The communication module 506 556 can pass the settings onto the environment-translation software 504 554 which can convert the standard configuration settings into configuration settings specific for the automobile 502 552. The environment-translation software 504 554 is further configured to instruct one or more components to configure themselves according to measurements provided by the environment-translation software 504 554.

FIG. 6 illustrates another exemplary system embodiment, which is somewhat similar to the system embodiment of FIG. 5. The main difference between the two systems it that the environment-translation software 624 is part of the environment-configuration application 622 on the portable electronic device 620. In this embodiment the automobiles 602 652 still include software 604 654 to collect measurements and data from power mirrors 610 660, power seats 612 662, radio 614 664, climate control 616 666, etc. However, the automobile 602 652 does not perform a translation of the collected data and measurements into standard data; that function is performed on the portable electronic device 620.

When a user enters another automobile and would like that automobile to configure itself according to the user's preferences, the environment-configuration application 622 utilizes the environment-translation software 624 to convert the standardized measurements into measurements that correspond to the automobile to be configured.

In some embodiments wherein the environment-translation software 624 is on the portable electronic device 620 it will be appreciated that the software will need to include information on each car it may be used to configure or receive configurations from. In some embodiments, the software 624 will include a database of such information. In some embodiments, the software 624 can download configuration settings as required.

In order for the software 624 to know which automobile to translate a measure to or from, it can learn of the make and model of the automobile. This can be accomplished from a menu in a user interface, or the environment-configuration application 622 can be configured to automatically learn the make and model information from the automobile directly.

While up to this point the present technology has largely been described in the context of automobiles, it should be appreciated that the present technology is equally applicable to many other environments. For example, a hotel room might be another example wherein the present technology could be used to configure climate control settings, and television and lighting preferences. Further, it should be appreciated that in some environments translation of measurements or data might not be needed.

Figure 7:
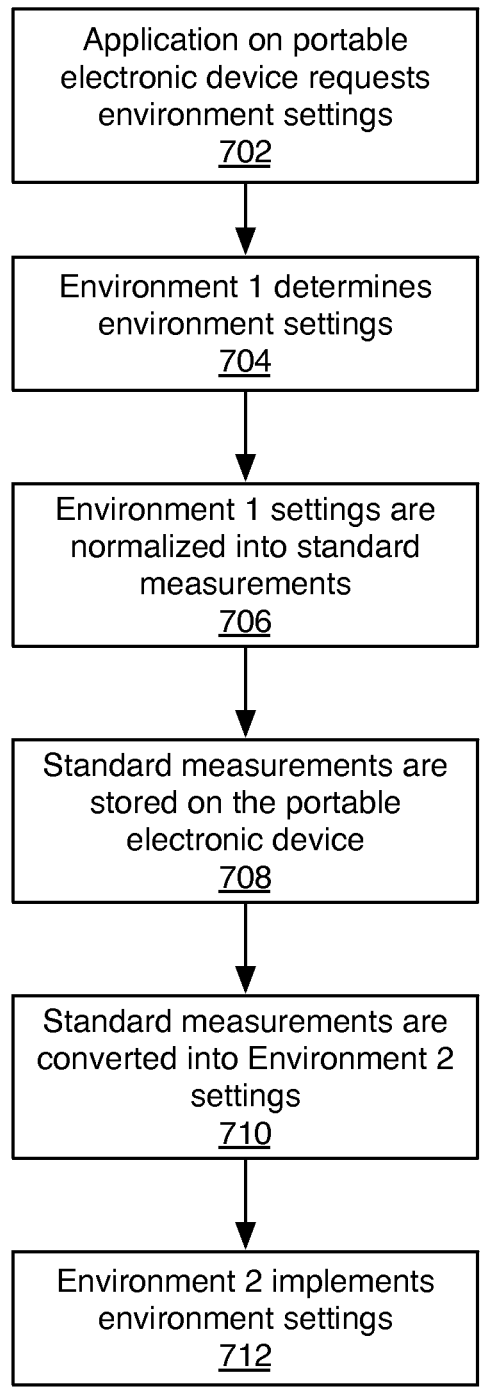
FIG. 7 illustrates an exemplary method embodiment.

FIG. 7 illustrates a flow chart presenting an exemplary method embodiment. A user can use an application on a portable electronic device to request environment settings 702 from a selected environment, Environment 1. Environment 1 can determine the requested environmental settings 704, and if needed the settings can be normalized into standard measurements 706 either on the portable electronic device or by Environment 1. The standard measurements can be stored on the portable electronic device 708. Later, when the user enters a new but similar environment, Environment 2, the user can direct the portable electronic device to inform Environment 2 that it should configure itself. Again, the standardized measurements can be converted 710 into Environment 2 settings either by the portable device or Environment 2, and Environment 2 can implement the settings 712.

As addressed above, in some embodiments it is necessary to convert measurements taken from one environment into measurements suitable for another similar environment. While such conversion can be performed as discussed above, it can be anticipated that in some embodiments the conversions require a slight adjustment. In such embodiments the technology discussed herein can update its data with the adjustments the user makes in a different environment. Each environment can be thought of as a different context to evaluate the user's preferences.

In some embodiments the application on the portable electronic device can report that such modifications were made to a central repository. If many users are making similar adjustments in similar environments it could be an indication that the environment-translation software might require updating or refinement based on aggregated user data.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied other types of files to control the secure deletion of those files and other copies of those files from storage. Those skilled in the art will readily recognize various modifications and changes that may be made to the principles described herein without following the example embodiments and applications illustrated and described herein, and without departing from the spirit and scope of the disclosure.

I claim:

1. A portable electronic device for repositioning adjustable fixtures in vehicles, the portable electronic device comprising:
    a communication module;
    a processor; and
    a memory that stores computer program instructions, wherein the computer program instructions, when executed by the processor, cause the processor to:
    receive, from a first vehicle using the communication module, a first configuration setting that is specific to the first vehicle, the first configuration setting describing a preferred position of a first adjustable fixture in the first vehicle,
    translate the first configuration setting into a standard measurement,
    translate the standard measurement into a second configuration setting that is specific to a second vehicle, and
    transmit, to the second vehicle using the communication module, the second configuration setting to the second vehicle for use in moving a second adjustable fixture in the second vehicle from an initial position to an adjusted position that is based on the preferred position.

2. The portable electronic device of claim 1, wherein the computer program instructions cause the processor to translate the first configuration setting into the standard measurement according to first translation information associated with a first make and model designation for the first vehicle and then translating the standard measurement into the second configuration setting according to second translation information associated with a second first make and model designation for the second vehicle.

3. The portable electronic device of claim 1, further comprising:
    an environmental settings database, wherein the standard measurement is stored in the environmental settings database.

4. The portable electronic device of claim 1, wherein the second adjustable fixture is an adjustable steering wheel.

5. The portable electronic device of claim 1, wherein the second adjustable fixture is an adjustable seat.

6. The portable electronic device of claim 5, wherein the second configuration setting is usable by the second vehicle to adjust an angle of recline of the adjustable seat.

7. The portable electronic device of claim 6, wherein the second configuration setting is usable by the second vehicle to move the adjustable seat linearly.

8. A method of reconfiguring adjustable fixtures in vehicles, the method comprising:
    translating data regarding a preferred position of an adjustable fixture in a first vehicle from a first setting specific to the first vehicle to a second setting specific to a second vehicle by first translating the first setting into a standard measurement and then translating the standard measurement into the second setting; and
    repositioning the adjustable fixture in the second vehicle from a first position to the preferred position using the second setting.

9. The method of claim 8, further including:
    communicating data regarding the first position of the adjustable fixture in the second vehicle to the portable electronic device; and
    comparing the first position of the adjustable fixture in the second vehicle to the preferred position of the adjustable fixture.

10. The method of claim 8, further including:
    using a portable electronic device to determine the first position of the adjustable fixture in the second vehicle; and
    comparing the first position of the adjustable fixture in the second vehicle to the preferred position of the adjustable fixture.

11. The method of claim 8, further comprising:
    receiving the data regarding the preferred position of the adjustable fixture in the first vehicle from the first vehicle; and
    storing the data regarding the preferred position on the portable electronic device.

12. The method of claim 11, wherein repositioning the adjustable fixture in the second vehicle includes repositioning an adjustable steering wheel in the second vehicle.

13. The method of claim 11, wherein repositioning the adjustable fixture in the second vehicle includes repositioning an adjustable seat in the second vehicle.

14. The method of claim 13, wherein repositioning the adjustable seat includes moving the adjustable seat linearly.

15. The method of claim 13, wherein repositioning the adjustable seat includes pivoting the adjustable seat to adjust an angle of recline.

16. A method of reconfiguring adjustable fixtures in vehicles, the method comprising:
    moving an adjustable fixture in a first vehicle from an initial position to a preferred position;
    communicating data regarding the preferred position of the adjustable fixture in the first vehicle to a portable electronic device;

using translation software on the portable electronic device to translate the data regarding the preferred position from a first configuration setting specific to the first vehicle into a second configuration setting specific to a second vehicle according to translation information that corresponds to a make and model of the first vehicle and corresponds to a make and model of the second vehicle;

communicating the second configuration setting to an adjustable fixture in the second vehicle; and moving the adjustable fixture in the second vehicle from an initial position into the preferred position.

17. The method of claim 16, further including:

communicating data regarding the initial position of the adjustable fixture in the second vehicle to the portable electronic device; and comparing the initial position of the adjustable fixture in the second vehicle to the preferred position of the adjustable fixture.

18. The method of claim 16, further including:

using the portable electronic device to determine the initial position of the adjustable fixture in the second vehicle; and comparing the initial position of the adjustable fixture in the second vehicle to the preferred position of the adjustable fixture.

19. The method of claim 16, wherein moving the adjustable fixture in the first vehicle includes moving a steering wheel in the first vehicle, and wherein moving the adjustable fixture in the second vehicle includes moving a steering wheel in the second vehicle into the preferred position.

20. The method of claim 16, wherein moving the adjustable fixture in the first vehicle includes moving a seat in the first vehicle, and wherein moving the adjustable fixture in the second vehicle includes moving a seat in the second vehicle into the preferred position.

* * * * *